United States Patent Office 3,525,872
Patented Aug. 25, 1970

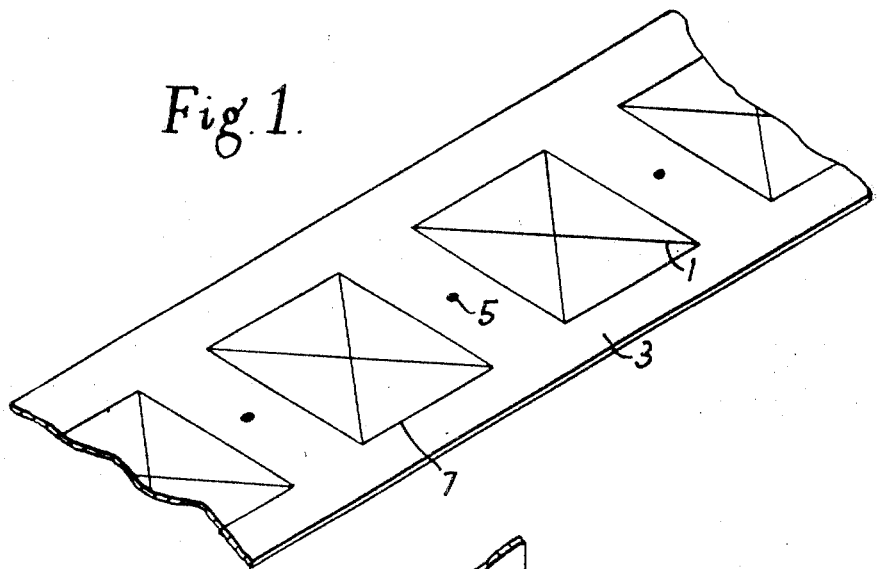
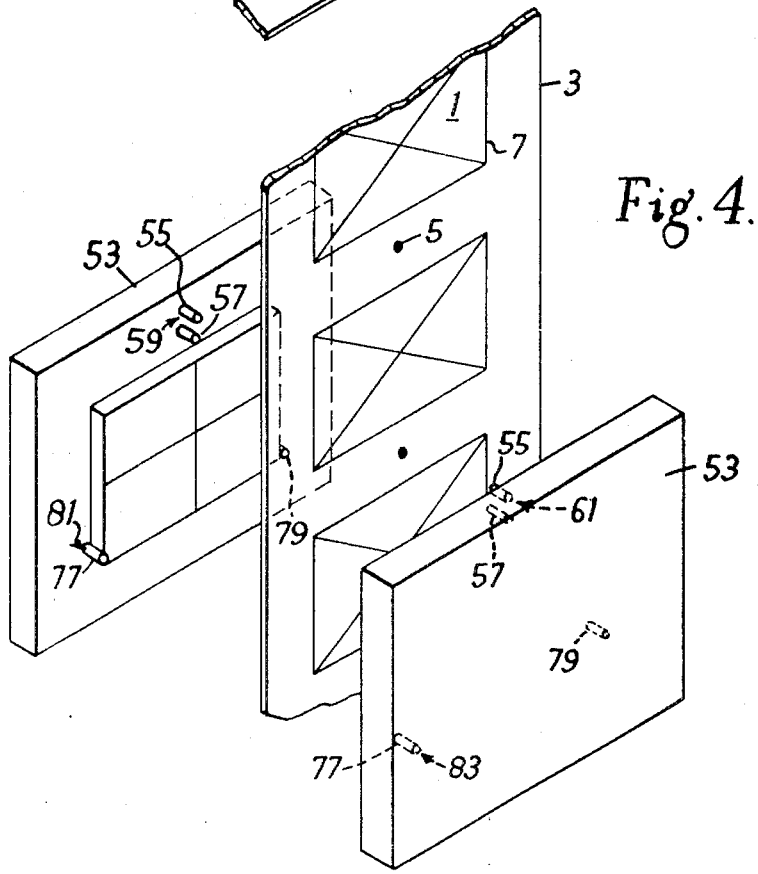

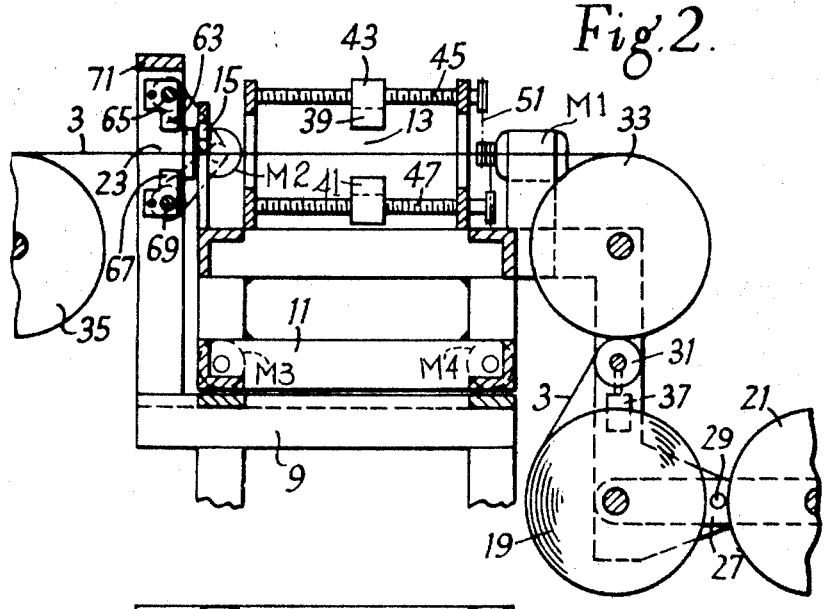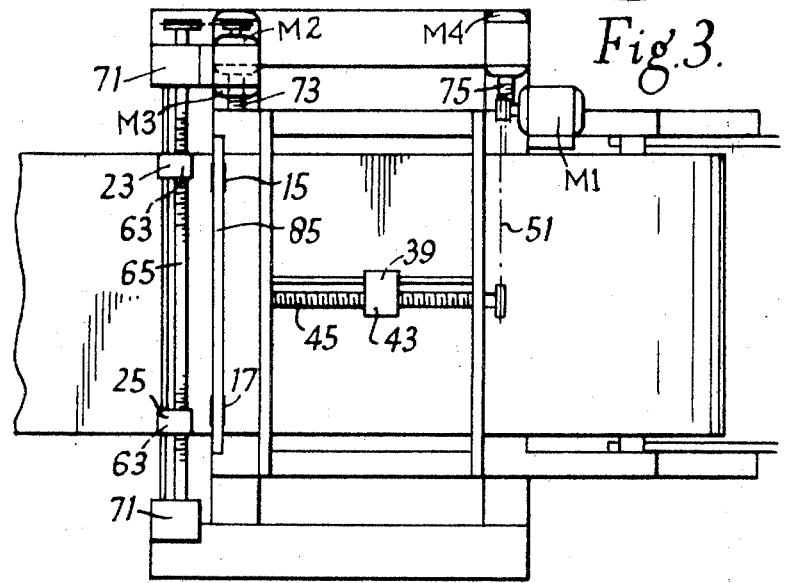

3,525,872
RADIATION SENSITIVE CONTROL MEANS FOR A MOVING SHEET HAVING REGISTRATION MARKS
Jack M. Schneider, Purley, England, assignor to Calmec Extruform Limited, Redhill, Surrey, England
Filed Nov. 4, 1968, Ser. No. 773,160
Claims priority, application Great Britain, Nov. 3, 1967, 50,034/67
Int. Cl. B41f 1/10; G01n 21/30
U.S. Cl. 250—219
20 Claims

ABSTRACT OF THE DISCLOSURE

Control means for an apparatus for carrying out a printing or article-forming operation on each section of material driven along a predetermined path. A first lengthwise detector of the control means detects the arrival of a register mark on the material at a location in the path in advance of operating means of the apparatus and generates a first control signal which actuates the operating means. A second lengthwise detector, disposed near to the operating means, determines the position on the material at which the operation is effected by the operating means and, if this is not in register with a section, generates a second control signal for moving the position of the first lengthwise detector accordingly. Lateral and skew detectors are also provided.

BACKGROUND OF THE INVENTION

This invention relates to control means for apparatus wherein material formed at locations equally or substantially equally spaced lengthwise thereof with detectable register means is driven along a path within which sections of the material respectively disposed at predetermined locations relative to respective register means in a direction lengthwise of the material are sequentially engaged by operating means and are subjected thereby to a predetermined operation.

In many industries are made by printing advertising or the like matter on each of a series of sections spaced lengthwise of a sheet or tube of material and then driving the material through an apparatus wherein each section in turn is subjected to a further operation. The material used in this process may be single-ply thermoplastics material, metal, paper, cloth, etc., or it may consist of two or more sheets bonded together. The further operation may involve deforming the sheet or tube to form a container or it may simply consist in applying further printed matter, usually of a different colour from the original, to each section. The operation can be effected by tool means which are stationary relative to the direction of travel of the material, in which case the material is intermittently advanced past the article forming apparatus, or by tool means which are reciprocated lengthwise of the sheet and operate whilst the sheet is moving.

In all these processes steps must be taken to ensure that the further operation is carried out in the correct position relative to the printed matter already provided on each section, i.e. is in "register with" the printed matter.

STATEMENT OF THE INVENTION

The present invention consists in control means for an apparatus wherein material formed at locations equally or substantially equally spaced lengthwise thereof with detectable register means is driven along a path within which sections of the material disposed at predetermined locations relative to respective register means in a direction lengthwise of the material are sequentially engaged by operating means and are subjected thereby to a predetermined operation, the control means comprising first detecting means for mounting at a predetermined location in the path in advance of the operating means, means adapted, upon detection of a register means by the detecting means, to generate a signal for actuating the apparatus, whereby relative movement lengthwise of the path between the operating means and the material is terminated and relative movement is effected laterally of the path so as to cause engagement between the operating means and the material, driving means for effecting relative movement lengthwise of the path between the material and the first detecting means, second detecting means adapted, when relative movement lengthwise of the path between the operating means and the material has terminated, to detect the position of a register means lengthwise of the path relative to a predetermined position which corresponds to registry in a lengthwise direction between the operating means and the associated section, means adapted to generate a second control signal representative of the location of the register means detected by the second detecting means relative to the said predetermined position when relative movement lengthwise of the path between the material and the operating means has terminated, and means for applying the second control signal to the driving means, whereby relative movement is effected between the material and the first detecting means in a sense corresponding to registry in the lengthwise direction between the succeeding section and the operating means when the next engagement between the material and the operating means is effected.

The "register means" may consist of printed matter provided on each section of the material, and, accordingly, incorporated in the final product. This printed matter has different optical or magnetic properties from the remainder of the section and can therefore be detected by suitable optical or magnetic detecting means.

Alternatively, the register means may take the form of an additional register mark or marks provided on or near to the associated section and, again, detectable by virtue of its optical or magnetic properties.

As examples of suitable register means, one or more apertures or areas having optical transmission or reflecting properties different from the remainder of the material may be formed in each section or adjacent thereto, in which case the arrival of the register means at a predetermined location on the path is deteced by photoelectric means. Alternatively, the register means may be an area coated with magnetic material which is detectable by means of a magnetic head. In the case of metal or board the register means may take the form of a projection formed in the material and detectable by means of proximity switches etc.

If the register means associated with such section consists of a single aperture, mark, transparent area etc., the second detecting means may comprise two detectors which are spaced apart lengthwise of the path. These detectors are so arranged that a section of the material is in a predetermined position in registry with the operating means when the associated register mark is between the two detectors. An error in the position of the material relative to the operating means results in the mark being detected by one or other of the detectors, depending upon the sense of the error, and the second control signal is then adapted to operate the driving means to move the first detecting means in the appropriate direction.

If the register means associated with each section consists of a single aperture, mark, transparent area, etc., it is possible for the detecting means to include only a single detector as long as the register means is one which has some variation in properties, for example, dimensions, which varies in a direction lengthwise of the path. Assuming that the register means is an aperture, for example, this may be shaped so as to have a width which increases from one end thereof to the other end and may be so arranged that the associated section is in register with the operating means when a part of the aperture intermediate the ends thereof is adjacent the detector. An error in the position of the material relative to the operating means then results in a wider or narrower part of the aperture being disposed adjacent to the detector, according to the sense of the error, when the operating means engage the sheet.

If the register means associated with each section consists of two dissimilar apertures, marks, transparent areas, etc. spaced apart lengthwise of the path it is again possible to employ a single detector as the second detecting means. In this case the detector is so arranged it lies intermediate the two apertures etc. when the operating means engage the material in registry with the associated section. An error in the position of the material relative to the operating means results in detection of one or other of the apertures etc., by the detector, the sense of the error being determined by which of the dissimilar marks is detected.

Preferably, the material is formed with lateral, detectable register means disposed at predetermined locations relative to respective sections in a direction laterally of the material and the control means further comprise first lateral detecting means adapted to detect the location of a lateral register means in a direction laterally of the path of the material relative to a predetermined position which corresponds to registry in the lateral direction between a section and the operating means, lateral driving means for effecting relative movement laterally of the path between the material and the first lateral detecting means and operating means, means adapted to generate a first lateral control signal representative of the location of a lateral register means detected by the first lateral detecting means relative to the said predetermined position, and means for applying the first lateral control signal to the lateral driving means, whereby relative movement is affected between the material and the first lateral detecting means and operating means in a sense corresponding to registry in a lateral direction between the sections of the material and the operating means.

Suitably, the first lateral detecting means are mounted at a location in the path of the material in advance of the operating means, and the control means further comprise second lateral driving means for effecting relative movement laterally of the path between the first lateral detecting means and the operating means, second lateral detecting means for mounting on or near the operating means, the second lateral detecting means being adapted to detect the location in a direction laterally of the path of a lateral register means which is adjacent to the operating means relative to a predetermined position corresponding to registry in the lateral direction between the operating means and one of the said sections of the material, means adapted to generate a second lateral control signal representative of the location of a lateral register means detected by the second lateral detecting means relative to the said predetermined position, and means for applying the second lateral control signal to the second lateral driving means whereby relative movement is effected between the first lateral detecting means and the operating means in a sense corresponding to registry in a lateral direction between the sections of the material and the operating means.

Suitably, the control means includes skew detecting means adapted to detect movement of a part of the material relative to another part thereof in a direction laterally of the said path, means adapted to generate a skew control signal representative of the said movement, and means for applying the skew control signal to material driving means, whereby the drive of the material is changed in a manner which reduces the said movement.

BRIEF DESCRIPTION OF THE DRAWINGS

The invention will now be described, by way of example, with reference to the accompanying drawings, in which:

FIG. 1 is a perspective view of a sheet having printed matter and register marks thereon for use with control means according to the invention;

FIG. 2 is a diagrammatic side elevation showing various parts of a control means for a printing apparatus according to the invention;

FIG. 3 is a plan view of the parts of the control means shown in FIG. 2;

FIG. 4 is a diagrammatic view showing the mounting of lengthwise and lateral detectors of the control means of FIG. 2 relative to the plates of the printing apparatus.

Figure 5A:
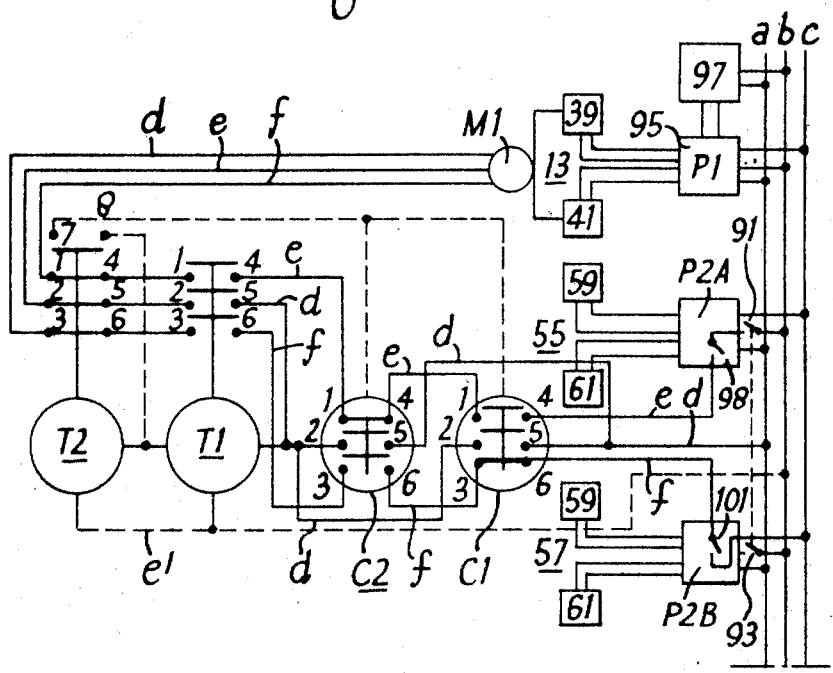
FIG. 5 is an electrical circuit of the control means of FIGS. 1 to 4.

The control means shown in the drawings is for use with a printing apparatus of the kind wherein a sheet of thermoplastics material, paper, cloth, etc., is driven along a predetermined path within which a printing operation is effected on spaced sections of the material by plates reciprocable lengthwise of the path.

In the present case it is desired to produce articles which bear advertising or other printed matter of two different colours at predetermined positions thereon. Referring to FIG. 1 of the drawings, printed matter 1 of one colour is therefore provided on an initial sheet 3 of material supplied to the printing apparatus (not shown) from a roll, there being printed matter on each of a series of sections which are equally or substantially equally spaced lengthwise of the sheet. Further printed matter of the other colour is then applied to each section by the printing apparatus. Subsequently, each section is cropped from the sheet and serves as the finished article.

To ensure that printed matter of the second colour appears in a predetermined position on each of the finished articles, i.e. that printing is effected by the printing apparatus when printing plates thereof are in registry with a section of the sheet 3 bearing printed matter 1 of the first colour, register marks are provided on the sheet 3 and the present control means includes a number of detectors associated with these register marks. These register marks and associated detectors are as follows:

First, a "lengtwise" register mark 5 is provided at a predetermined location in advance of each printed section of the sheet 3 and midway between the longitudinal side edges thereof. Associated with the lengthwise register marks 5 are a group of "lengthwise detectors" which serve to ensure that a printing operation is carried out at the correct position lengthwise of the sheet 3.

Secondly, the longitudinal side edges 7 of each piece of printed matter 1 on the sheet 3 are used in determining the correct position of the sheet in a direction laterally of the sheet path, and thence side edges 7 therefore serve as "lateral" register marks. A group of "lateral detectors" are associated with the side edges, or lateral register marks 7, and serve to ensure that printing is effected at the corrected position in a direction laterally of the sheet.

Thirdly, there are a pair of "skew detectors" which ensure that a section of the sheet 3 lies in a plane parallel with the printing plates when these plates engage the section.

Associated with each group of detectors of the control means are means for generating control signals whenever an error in the position of a section is detected and means for applying these signals to driving means which effect appropriate adjustment of the positions of the detectors.

Referring to FIGS. 2 and 3, the present control means includes a substantial base 9 upon which is mounted a movable support 11 for a first lengthwise detector 13, skew detectors 15 and 17, a supply roll 19 and a spare roll 21 for the pre-printed sheet 3, and driving means associated with the lengthwise detectors. Also mounted upon the base are a first pair of lateral detectors 23 and 25 and driving means therefor.

For supporting the supply roll 19 and the spare roll 21 two parallel arranged, mutually spaced supporting arms 27 are each pivotally mounted at the midpoints thereof on a framework 29 which is secured to the movable support 11 at a location downwardly and rearwardly thereof, to the right in FIGS. 2 and 3. In their operative position the arms 27 extend horizontally in a direction from front to rear of the support 11 with the supply roll 19 rotatably supported between their forward ends, adjacent to the base 9 of the control means. Sheet 3 from the supply roll 19 extends upwardly and then horizontally between a tension roll 31 and a torque roller 33 which are arranged with their axes vertically above the supply roll 19. From the torque roller 33 the sheet 3 travels forwardly across an upper part of the movable support 11 to the printing apparatus, where it is driven downwardly by a pair of upper driving rollers 35.

At the rearward ends of the supporting arms 27 for the supply roll 19 is the spare roll 21, which can be spliced to the trailing end of a sheet 3 leaving the supply roll when the latter is emptied, thereby avoiding a discontinuity in the supply of sheet to the printing apparatus. The arms 27 are then pivoted about their midpoints to bring the spare roll 21 into the supply position vertically below the tension roll 31 and torque roller 33 and a fresh spare roll is then mounted at the rear of the arms 27. The torque roller 33 is provided with a constant torque mechanism of known type which ensures that a sheet 3 travelling horizontally across the movable support 11 is subjected to a constant tension lengthwise thereof. An air motor 37 which is mounted on the framework 29, beneath the tension roller 31, biases the tension roller upwardly towards engagement with the torque roller 33.

At an intermediate location in its travel across the movable support 11 the sheet 3 from the torque roller 33 passes a light source and optical projection means 39 and a photoelectric cell 41 of the first lengthwise detector 13. Light from the source and projection means 39, which are mounted above the path of the sheet 3, is projected downwardly and is normally transmitted through the translucent sheet to the photoelectric cell 41, mounted below the sheet path. The cell 41 is therefore normally conducting. When one of the opaque lengthwise register marks 5 reaches a position in the path wherein it is aligned with the source and projection means 39 and the photocell 41 the intensity of light falling on the cell 41 is reduced and the current flowing through the cell is likewise decreased. Electrical circuit means associated with the cell 41 then generate a first control signal, as hereinafter described.

The light source and optical projection means 39 of the first lengthwise detector 13 are secured to a mounting 43 which is threadably engaged with a screw 45 extending lengthwise and above the sheet path and the photoelectric cell 41 is mounted on a similar screw 47 below the path. A first driving motor M1 has an output shaft thereof coupled to the screws 45 and 47 by coupling means generally designated 51 and, when operated, rotates the screws in unison so as to effect lengthwise movement of the source and projection means 39 and the photocell 41, as hereinafter described.

The first control signal, which is generated in response to the detection of a register mark 5 by the first lengthwise detector 13, is used to initiate a printing operation by the printing apparatus. Referring to FIG. 4, a carriage (not shown) carrying printing plates 53 of this apparatus is initially at rest in an uppermost position. The first control signal is applied to a contactor, hereinafter described, of the present control means and thence to a microswitch in an electrical circuit associated with the printing apparatus, which operates to initiate downwards movement of the carriage. A predetermined interval of time after it has begun to move downwardly the carriage operates a further microswitch of the electrical circuit, which causes the printing plates 53 to be moved inwardly to engage a section of the sheet 3.

It will be appreciated that the location of the first lengthwise detector 13 in a direction lengthwise of the path of sheet 3 must be such that when a register mark 5 is detected thereby a section of the sheet 3 which is in advance of the detector 13 and is to be subjected to printing is located a short distance above the plates 53 of the printing apparatus. During the interval between detection of a register mark 5 by the first lengthwise detector 13 and acceleration of the carriage from rest to a speed equal to the rate of downwards movement of the sheet 3 the latter must have moved downwardly by an amount sufficient to bring the section into register with the plates 53.

Associated with the lengthwise detector 13 on the movable support 11 of the control means are two further lengthwise detectors 55 and 57 which are mounted on the printing plates 53. These further lengthwise detectors 55 and 57 are spaced apart lengthwise of the sheet 3 and are so arranged relative to one another that when the carriage is moving downwards at the same rate as the sheet 3 and one of the sections of the sheet bearing the printed matter 1 is in register with the plates 53 the lengthwise register mark 5 associated with that section is disposed intermediate the further detectors. If there is an error in the position of the carriage relative to the sheet, so that the plates 53 are not in register with a sheet section, the associated register mark 5 is detected by one or other of the further detectors 55 and 57.

Each of the further lengthwise detectors 55 and 57 includes a light source and optical projection means 59 which are mounted on one side of the sheet path and a photocell 61 mounted on the other side of the path. Electrical circuit means associated with the detectors 55 and 57 and hereinafter described are actuated a predetermined interval of time after the carriage has commenced its downwards movement, and is travelling at the same speed as the sheet 3, and if there is an error in the position of the register mark 5 the circuit means generate a second control signal whose polarity depends upon which of the further detectors has detected the mark. The signal is applied to the motor M1, which operates to move the first lengthwise detector 13 in a sense corresponding to the performance of the next printing operation in register with the succeeding section of the sheet 3 as hereinafter described.

The first pair of lateral detectors 23 and 25 are disposed at a location on the path of the sheet 3 which is subsequent to the location of the first lengthwise detector 13. Each includes a source of light and optical projection means 63 which are mounted on a screw 65 extending laterally of the sheet path, above the sheet 3, and a photocell 67 which is mounted on a further laterally extending screw 69 below the sheet.

The screws 65 and 69 are mounted on brackets 71 upstanding from the base 9 of the control means.

A second driving motor M2, associated with the first pair of lateral detectors 23 and 25, and also mounted on the upstanding brackets 71, has its output shaft coupled to the screws 65 and 69 by coupling means (not shown) and, upon operation, effects rotation of the screws so as to move the detectors 23 and 25 laterally of the sheet 3, as hereinafter described.

Also associated with the lateral detectors 23 and 25 are a third driving motor M3 and a fourth driving motor M4 which are mounted on the base 9 of the control means at the front and rear of the movable support 11, respectively. Coupled to the output shafts of respective motors M3 and M4 are laterally extending screws 73 and 75 respectively, which are threadably engaged with the movable support 11 so that operation of one of the motors causes movement of the adjacent end of the support in a direction laterally of the sheet path, as hereinafter described.

As mentioned above, the purpose of the lateral detectors is to ensure that printing is effected at the correct position, laterally of the sheet, relative to the printed matter 1 on each section. Since there may be a variation in the lateral position of the printed matter 1 on the supply roll 19 it is necessary to arrange for a variation, in a direction laterally of the sheet path, in the position of sheet 3 supplied to the printing apparatus.

To this end the first lateral detectors 23 and 25 are spaced apart in a direction laterally of the sheet 3, i.e. lengthwise of the screws 65 and 69, by an amount slightly greater than the width of the printed matter 1 on each section. Their position relative to the printing plates 53 of the printing apparatus is adjusted so that if the printed matter 1 on sheet 3 from the supply roll 19 just passes between the detectors 23 and 25, and is not therefore detected by either, the printed matter 1 is in the correct position for printing as regards its location laterally of the sheet path.

If the printed matter 1 on a section is not in the correct lateral position it reduces the amount of light passing from the source and projection means 63 of one lateral detector, 23 or 25 to the associated photocell 67. Electrical circuit means associated with the lateral detectors 23 and 25 then generate a first lateral control signal of polarity dependent upon which of the photocells 67 has received a reduced light intensity, which is applied to both of the above-mentioned driving motors M3 and M4. These motors M3 and M4 are operated to drive the associated screws 73 and 75 so that the movable support 11 of the control means, and hence the supply roll 19, tension roller 31, torque roller 33 and the sheet 3 engaging these rollers is moved, laterally of the sheet path, in a sense corresponding to removal of the error in the lateral position of the sheet.

Associated with the first lateral detectors 23 and 25 on the movable support 11 are a second pair of lateral detectors 77 and 79, each having a light source and optical projection means 81, mounted on one plate 53 of the printing apparatus and a photoelectric cell 83 mounted in the opposed plate 53. The lateral detectors 77 and 79 are also spaced apart by a distance slightly greater than the width of the printed matter 1 on the sheet 3 and are so arranged that if the printed matter 1 is in the correct position relative to the plates 53 in a direction laterally of the sheet path, it is not detected by either detector. On the other hand, if there is an error in the lateral position of the printed matter 1 the latter is detected by one or other of the second pair of lateral detectors 77 and 79.

Electrical circuit means associated with the second pair of lateral detectors 77 and 79 are actuated at a predetermined interval of time after the carriage has commenced its downward movement, an is travelling at the same speed as the sheet 3. If there is then an error in the lateral position of the printed matter 1 the circuit means hereinafter described generate a second lateral control signal of polarity dependent upon which of the detectors 77 or 79 has detected the printed matter.

The second lateral control signal is applied to the driving motor M2, which operates to move the first pair of lateral detectors 23 and 25 in a direction laterally of the sheet path and in a sense corresponding to removal of the error in the position of the printed matter 1 relative to the printing plates 53, as hereinafter described.

The skew detectors 15 and 17 are mounted on a bracket 85 secured to the front of the movable support 11 of the control means, close to respective opposed edges of the sheet 3 and at a location in the sheet path subsequent to the first pair of lateral detectors 23 and 25.

From the power supply P1 current is supplied to the source and projection means 39 and the photocell 41 of the first lengthwise detector 13. In addition, the power supply P1 includes a relay (not shown) having a pair of contacts 95 connected in series with an output fiom the power supply to a contactor 97. The contactor 97, which is also supplied with current from the conductors a, b and c has contacts connected to the control circuit for the printing apparatus (not shown).

From each of the power supplies P2A and P2B there are output leads for the supply of current to the associated source and projection means 59 and photocell 61.

Associated with the further lengthwise detectors 55 and 57 are a pair of counters C1 and C2. Each of these counters includes a counter mechanism (not shown), a coil (not shown), three pairs of fixed contacts, 1 to 6, and three movable contacts, each movable contact being associated with a respective pair of fixed contacts.

Figure 5B:
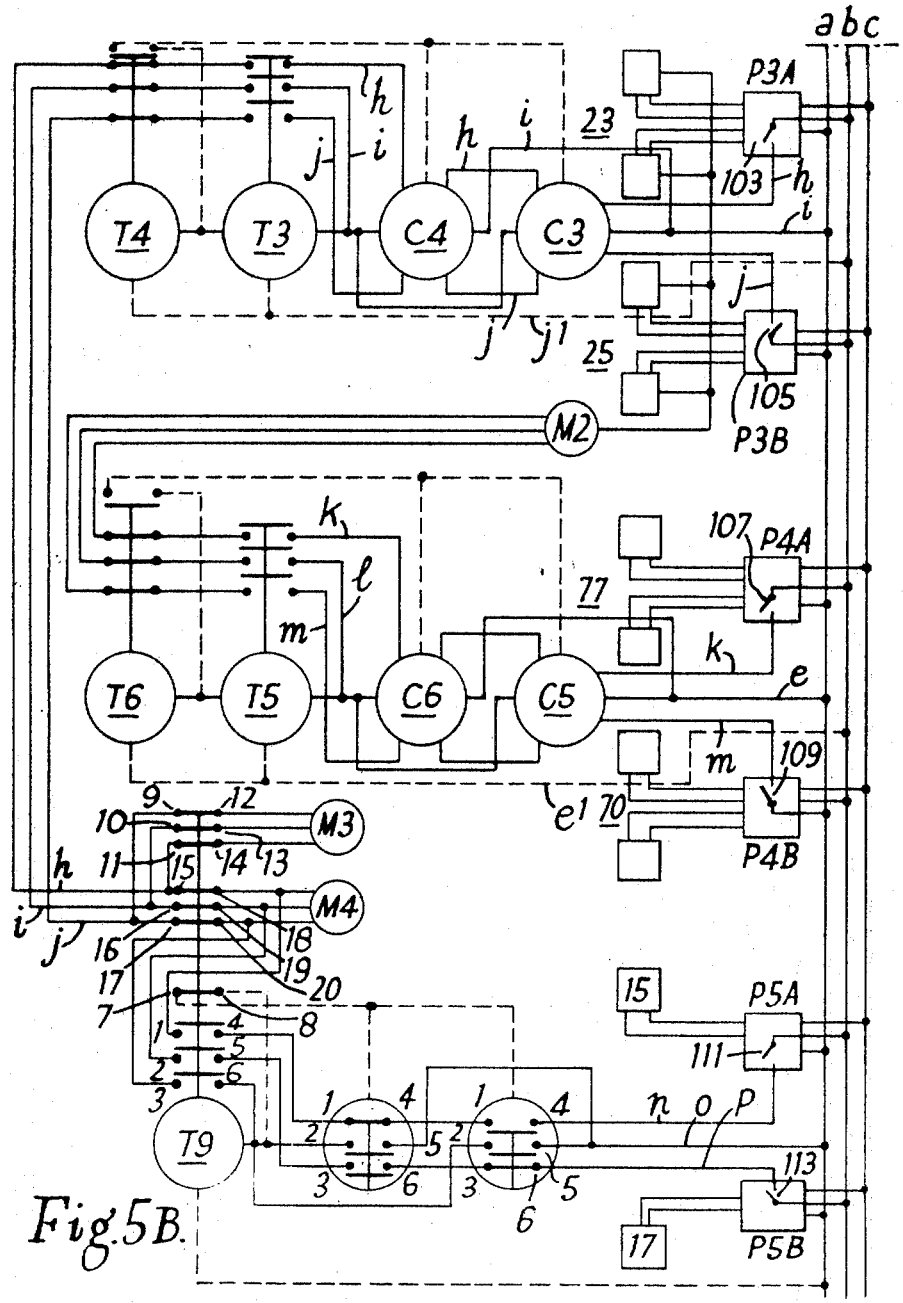

FIG. 5 shows the circuit in an inoperative condition, when the fixed contacts 1 and 4 and 2 and 5 of counter C1 and the fixed contacts 2 and 5 and 3 and 6 of counter C2 are open. Contacts 3 and 6 of counter C1 and contacts 1 and 4 of counter C2 are closed.

Also associated with the further lengthwise detectors 55 and 57 are a pair of timers T1 and T2, each having a timer mechanism and a coil (not shown) and a series of fixed and movable contacts. Timer T1 has three pairs of fixed contacts, 1 to 6, and three movable contacts, each movable contact being associated with a respective pair of fixed contacts. Timer 2 has four pairs of fixed contacts, 1 to 8, and four movable contacts, each movable contact being associated with a respective pair of fixed contacts. In the inoperative condition of the circuit, shown in FIG. 5, the fixed contacts 1 and 4, 2 and 5, and 3 and 6 of timer T1 are open, the contacts 1 and 4, 2 and 5, and 3 and 6 of timer T2 are closed, and the contacts 7 and 8 of timer T2 are open.

As indicated in FIG. 5, the conductor b of the three-phase supply is connected to one input of the above-mentioned motor M1 by means of a relay switch 99 in power supply P2A and a line e which extends to the motor via the fixed contacts 4 and 1 of the counters C1 and C2, and the fixed contacts 4 and 1 of timers T1 and T2. Associated with the switch 99 is a relay winding (not shown) which is energised as hereinafter described. The line e is also connected to the counter mechanism of counter C1.

The conductor c of the supply is connected to a second input of the motor M1 by means of a relay switch 101 in power supply P2B and a line f which extends to the motor via the fixed contacts 6 and 3 of the counters C1 and C2 and the timers T1 and T2. Associated with the switch 101 is a relay winding (not shown) which is energised as hereinafter described. Line f is also connected to the counter mechanism of counter C2.

The conductor a of the supply is connected to the fixed contact 5 of the timer T1 by a line d, included in which is a parallel circuit having the fixed contacts 5 and 2 of counter C1 in one arm thereof and the fixed contacts 5 and 2 of counter C2 in the other arm. The fixed contact 5 of timer T1 is connected to a third input of the motor M1 via the fixed contact 2 of timer T1 and the fixed contacts 5 and 2 of timer T2.

The conductor d is also connected to the timer mechanism and coils of the timers T1 and T2 and a return path for current from these timer mechanisms and coils extends via line e' to the conductor 5 of the supply.

Fixed contact 7 of the timer T2 is connected to resetting mechanisms in the counters C1 and C2 and fixed contact 8 is connected to the conductor d.

In operation of the present control means the detection of a register mark 5 by the first lengthwise detector 13 causes a decrease in the current drawn from the power supply P1 by the photoelectric cell 41 of detector 13. This decrease in current operates the above-mentioned relay which is associated with switch 95, causing this switch to close. Current is therefore supplied from the power supply P1 to energise the contactor 97 and from the contactor a first control signal is applied to an electrical circuit associated with the printing apparatus.

As indicated above, application of the first control signal to the electrical circuit of the printing apparatus initiates downwards movement of the carriage carrying the printing plates 53. After a predetermined interval of time, when the carriage is moving at a speed equal to the speed of travel of sheet 3, the plates 53 are moved inwardly to engage the sheet and effect a second printing operation thereon.

During its inwards movement one of the printing plates 53 closes the switch 91 and the switch 93, which is coupled thereto, is similarly closed. Current is then supplied to the power supplies P2A and P2B and the associated sources and projection means 59 and photoelectric cells 61 are energised.

If the printing plates 53 are then in register with the printed matter 1 on the sheet 3 a longitudinal register mark 5 is at a vertical location intermediate the further lengthwise detector 55 and 57, light can travel via the sheet 3 from each source and projection means 59 to the associated photoelectric cell 61, current flows between each photocell and the associated power supply P2A or P2B, the relay associated with respective switches 99 and 101 remain energised, and switches 99 and 101 remain open. There is then no action on the remainder of the circuit and the sources and projection means 59 and photoelectric cells 61 are de-energised when the plates 53 are moved apart after printing.

If the printing plates 53 are not in register with the printed matter 1 when the plates are moved towards engagement with the sheet 3 the register mark 5 reduces the intensity of light passing between one source and projection means 59 and the associated photoelectric cell 61 below a predetermined level. The magnitude of the current through the coil associated with switch 99 or 101 is increased, the coil is energised and the switch therefore closes until plates 53 are moved apart.

Assuming that switch 99 is closed a pulse of current is applied to the counter C1 of FIG. 5, via the switch 99 and line e. This pulse is applied to the counter mechanism, which thereby registers one count, and to the contact 4, which is disconnected from contact 1, as indicated in FIG. 5.

If there are three successive occasions upon which the plates 53 are moved inwards to effect printing and the plates are not in register with the printed matter 1 the counter mechanism in the counter C1 makes three counts. After the third count the counter mechanism energises the coil associated with the movable contacts and these contacts are moved from the inoperative condition of FIG. 5 to a condition wherein fixed contacts 1 and 4 and 2 and 5 are closed and contacts 3 and 6 are open.

Current now flows from the conductor a to the timers T1 and T2 via the line d and the closed contacts 5 and 2 of counter C1, there being a return flow along line e' to conductor b. Supply of current to timer T1 energises the coil thereof and causes the movable contacts to close the fixed contacts 1 and 4, 2 and 5 and 3 and 6 of the timer. These contacts remain closed for a predetermined interval of time, determined by the timer mechanism of timer T1 as hereinafter described. Supply of current to timer T2 energises a timer mechanism therein, causing operation of the movable contacts of the timer after a predetermined interval of time, as hereinafter described.

With the fixed contacts of timer T1 closed current flows from conductor b to the motor M1 via line e and the fixed contacts 4 and 1 of counters C1 and C2 and timers T1 and T2. A return path for current extends from the motor M1 to conductor a via line d and fixed contacts 2 and 5 of timers T1 and T2 and counter C1.

Motor M1 is therefore energised and drives the first lengthwise detector 13 lengthwise of the path of sheet 3, in a sense corresponding to removal of the error in position of printed matter 1 during a subsequent printing operation. As indicated above, the timer mechanism of timer T1 determines the period for which the fixed contacts of the timer are closed, and hence the period of time for which the motor M1 is energised and the distance lengthwise of the sheet path through which the first lengthwise detector 13 is moved. This period is pre-set to a value corresponding to movement of the detector 13 through a distance shorter than the error in position of the printed matter 1 which is normally expected. At the end of the period the timer mechanism in timer T1 de-energises the coil of the timer and causes the fixed contacts 1 and 4, 2 and 5 and 3 and 6 to open. Supply of current to motor M1 is therefore cut off.

After a further predetermined period of time the timer mechanism of timer T2 operates the movable contact of this timer, as indicated above. This opens the fixed contacts 1 and 4, 2 and 5 and 3 and 6 of the timer T2, thereby providing a further break in the lines to motor M1. In addition, contacts 7 and 8 of timer T2 are closed and a signal is applied via line d and these contacts 7 and 8 to the counters C1 and C2, re-setting the counters.

The period of time before the movable contact of timer T2 re-sets counters C1 and C2 is arranged to be sufficient for the effect of the change in position of the first lengthwise detector 13 to have become apparent at the printing plates 53, i.e. for the detector 53 to have settled down again to steady operation. Without this period of deactivation a further printing operation may be effected and an error in the position of a succeeding register mark 5 may be detected by the detectors 55 and 57 before the detector 13 has settled down. The circuit means would then energise the driving motor M1 again causing further movement of the detector 13 and a danger of the detector overshooting its correct position. This would lead to the generation of further error signals and overshooting in first one sense and then the other, i.e. "hunting."

It will be appreciated that if there is an error in the opposite sense to that described above this error is detected by the further lengthwise detector 57. Switch 101 in power supply P2B is then closed and the motor M1 is energised to move detector 13 in the opposite sense via counter C2 and lines d and f.

Referring now to FIG. 5, the first pair of lateral detectors 23 and 25 are provided with power supplies P3A and P3B, respectively, on the lines of the above power supplies P2A and P2B. Power supplies P3A and P3B includes switches 103 and 105, respectively, which are closed when the associated detectors 23 or 25 detects a lateral register mark 7.

Associated with the detectors 23 and 25 are counters C3 and C4 corresponding to the above counters C1 and C2 and timers T3 and T4 corresponding to timers T1 and T2. Lines h, i, j, and i' correspond to the above lines d, e, f and e', respectively, and couple the conductors a, b and c of the supply to motors M3 and M4 via the counters C1 and C2 and timers T1 and T2. There are also further fixed contacts in the lines to M3 and M4 but these contacts are normally closed by associated movable contacts and are hereinafter described in connection with the skew detectors 15 and 17.

The operation of the circuit means associated with lateral detectors 23 and 25 corresponds to the above-described operation of the further lengthwise detectors 55 and 57. Counters C3 and C4 prevent operation of the motors M3 and M4 unless three successive errors have been detected. Timer T3 restricts movement of the movable support 11 to a distance shorter than the expected error in the lateral position of the sheet 3. Timer T4 re-sets the detectors 23 and 25 after a predetermined interval of time and prevents hunting, as described above.

Associated with the further lateral detectors 77 and 79 are respective power supplies P4A and P4B and switches 107 and 109, counters C5 and C6, timers T5 and T6, and lines $k$, $l$, $m$ and $l'$. The lateral detectors 77 and 79 effect operation of motor M2 in the manner described above for motor M1.

The skew detectors 15 and 17 are provided with power supplies P5A and P5B, respectively, and these power supplies include respective switches 111 and 113. Each switch is closed when the skew detector 15 and 17 associated therewith detects a skew in the sheet 3.

Associated with skew detectors 15 and 17 are timers T7, T8 and T9 and lines $n$, $o$ and $p$.

Timers T8 and T9 each have six fixed contacts, contacts 1 to 6, three movable contacts, a timer mechanism and a coil (not shown). Contacts 1 and 4 and 2 and 5 of timer T7 and contacts 2 and 5 and 3 and 6 of timer T8 are normally open. Contacts 3 and 6 of timer T7 and contacts 1 and 4 of timer T8 are normally closed.

Timer T9 has a timer mechanism (not shown), a coil (not shown), twenty fixed contacts, contacts 1 to 20, and ten movable contacts.

Line $n$ extends from the power supply P5A to a branch of line $h$ feeding motor M4, via fixed contacts 4 and 1 of timers T7, T8 and T9. Line $o$ extends from conductor $b$ of the line to a branch of line $j$ feeding motor M4, via a parallel circuit having fixed contacts 5 and 2 of timer T7 in one arm thereof and a parallel circuit having contacts 5 and 2 of timer T8 in the other arm, and fixed contacts 6 and 3 of timer T9. Line $p$ extends from power supply P5B to a branch of line $i$ feeding motor M4, via fixed contacts 6 and 3 of timers T7 and T8 and contacts 5 and 2 of timer T9.

Line $o$ is also connected to re-setting mechanisms in timers T7 and T8 via fixed contacts 7 and 8 of timer T9. Line $q$ is a return path for currents energising the timer T9.

Fixed contacts 9 and 12 of timer T9 are connected in the branch of line $h$ feeding motor M3, fixed contacts 10 and 13 are in the branch of line $i$ feeding motor M3, etc.

If there is a skew in sheet 3 the sheet moves nearer to one or other of the skew detectors 15 and 17.

Assuming that the sheet 3 moves nearer to detector 15 the resulting change in current in the circuit associated with this detector closes the switch 111 in power supply P5A. Current now flows from the conductor $b$ of the supply, through the switch 111 to the timer T7, energising the timer mechanism and also energising the coil thereon, which causes contacts 1 and 4 and contacts 2 and 5 to close and contacts 3 and 6 to open. With the contacts of timer T7 in this condition, current flows via contacts 5 and 2 of timer T7 to the timer T9, energising the timer mechanism of this timer and also the coil. Contacts 1 and 4, 2 and 5 and 3 and 6 of timer T9 are therefore closed and contacts 7 and 8, 9 and 12, 10 and 13, 11 and 14, 15 and 18, 16 and 19 and 17 and 20 are opened.

Motors M3 and M4 are therefore disconnected from the above-described circuit associated with the lateral detectors 23 and 25. At the same time, current can flow to motor M4 via the lines $n$ and $o$, causing this motor to drive the rearward end of the movable support 11 laterally of the sheet path, in a direction corresponding to removal of the skew.

After a predetermined interval of time, less than the time needed for motor M4 to correct skew errors expected in the apparatus, the timer mechanism of timer T7 operates and returns the movable contacts to the position shown in FIG. 5, thereby cutting off the supply of current to motor M4. After a further predetermined interval of time the timer mechanism of timer T9 operates, returning the movable contacts thereof to the condition shown in FIG. 5 and applying a re-setting signal to timer T7. The latter is therefore ready to operate if a further skew is detected. The time interval before timer T9 re- sets timer T7 is sufficient for the effect of movement of the support 11 by motor M4 to have become apparent, thereby preventing hunting.

If a skew causes movement of sheet 3 towards detector 17 the motor M4 is operated to move the rearward end of support 11 in the opposite sense from the movement occasioned by detector 15, thereby removing the skew.

It will be appreciated that an error in the position of a section of the sheet 3 in a direction lengthwise of the sheet path may arrive from wear in the mechanism driving the sheet along the path, the upper driving rollers 35 of the printing apparatus, or a change in the dimensions of the sheet 3 itself, which may lead to a change in the effective spacing between the printing plates 53 and the lengthwise detector 13. Further, in an apparatus having plates 53 which are reciprocable lengthwise of the path and operate on a moving sheet the end position to which the plates are returned after disengagement from the sheet may vary. Printing is then no longer effected in register with a sheet section.

Errors of this nature can be reduced by providing lengthwise detector 13 and mounting this detector very close to the printing apparatus, in the case of reciprocable plates the detector would need to be mounted on the carriage which supports the plates.

On the other hand, further errors arise from variations in the time which elapses between detection of a mark and engagement of the sheet by the printing plates 53. This may be due to a variation in the speed at which the plates move inwardly to enegage the sheet or a variation in the speed of travel of the sheet. These errors are not removed by mounting the detector close to the plates. They are, however, substantially reduced or removed by employing the further pair of lengthwise detectors as described above.

I claim:

1. Control means for an apparatus wherein material formed at locations equally or substantially equally spaced lengthwise thereof with detectable register means is driven along a path within which sections of the material disposed at predetermined locations relative to respective register means in a direction lengthwise of the material are sequentially engaged by operating means and are subjected thereby to a predetermined operation, the control means comprising first detecting means for mounting at a predetermined location in the path in advance of the operating means, means adapted, upon detection of a register means by the detecting means, to generate a first control signal for actuating the apparatus, whereby relative movement lengthwise of the path between the operating means and the material is terminated and relative movement is effected laterally of the path so as to cause engagement between the operating means and the material, driving means for effecting relative movement lengthwise of the path between the material and the first detecting means, second detecting means adapted, when relative movement lengthwise of the path between the operating means and the material has terminated, to detect the position of a register means lengthwise of the path relative to a predetermined position which corresponds to registry in a lengthwise direction between the operating means and an associated section, means adapted to generate a second control signal representative of the location of the register means detected by the second detecting means relative to the said predetermined position when relative movement lengthwise of the path between the material and the operating means has terminated, and means for applying the second control signal to the driving means, whereby relative movement in effected between the material and the first detecting means in a sense corresponding to registry in the lengthwise direction between the succeeding section and the operating means when the next engagement between the material and the operating means is effected.

2. Control means as claimed in claim 1 for an apparatus for carrying out a predetermined operation on material formed at locations equally or substantially equally spaced lengthwise thereof with a single register means, wherein the second detecting means of the control means comprises two detectors spaced apart in a direction lengthwise of the said path, the said detectors being so arranged that a section of the material is in register with the operating means when the associated register means is at a location on the path intermediate the said detectors.

3. Control means as claimed in claim 1 for an apparatus for carrying out a predetermined operation on material formed at locations equally or substantially equally spaced lengthwise thereof with a single register means whose detectable property varies in a direction lengthwise of the path, wherein the second detecting means of the control means comprise a single detector sensitive to the lengthwise variation of the register means.

4. Control means as claimed in claim 1 for apparatus for carrying out a predetermined operation on material formed at locations equally or substantially equally spaced lengthwise thereof with two register means which are spaced apart in a direction lengthwise of the material, wherein the second detecting means of the control means comprises a single detector, the said detector being so arranged that a section of the material is in register with the operating means when the detector is at a location on the path intermediate the two register means.

5. Control means as claimed in claim 1 comprising counter means which are adapted to prevent the application of a second control signal to the driving means until the second detecting means have on each of a predetermined number of successive occasions wherein relative movement between the operating means and the material has terminated, detected a difference between the location of a register means and the predetermined position corresponding to registry between the operating means and the associated section of the material.

6. Control means as claimed in claim 1 comprising first timer means adapted to limit the application of the second control signal to the driving means to a predetermined interval of time, which interval of time is less than the time required for the driving means to effect relative movement sufficient to remove an expected difference between the position of a register means and the predetermined position corresponding to registry in a lengthwise direction between the operating means and the associated section.

7. Control means as claimed in claim 1 comprising second timer means adapted, after the application of a second control signal to the driving means, to prevent application of a further of the second control signals to the driving means for a predetermined time sufficient to prevent hunting.

8. Control means as claimed in claim 1 for an apparatus for carrying out a predetermined operation on material formed with lateral detectable register means disposed at predetermined locations relative to respective sections in a direction laterally of the material, the control means further comprising first lateral detecting means adapted to detect the location of a lateral register means in a direction laterally of the path of the material relative to a predetermined position which corresponds to registry in the lateral direction between a section and the operating means, lateral driving means for effecting relative movement laterally of the path between the material and the first lateral detecting means and operating means, means adapted to generate a first lateral control signal representative of the location of a lateral register means detected by the first lateral detecting means relative to the said predetermined position, and means for applying the first lateral control signal to the lateral driving means, whereby relative movement is effected between the material and the first lateral detecting means and operating means in a sense corresponding to registry in a lateral direction between the sections of the material and the operating means.

9. Control means as claimed in claim 8, comprising lateral counter means which are adapted to prevent the application of a first lateral control signal to the lateral driving means until the first lateral detecting means have, for each of a predetermined number of successive register means, detected a difference between the lateral position of the register means and the predetermined position which corresponds to registry in the lateral direction between a section and the operating means.

10. Control means as claimed in claim 8 comprising first lateral timer means adapted to limit the application of the first lateral control signal to the lateral driving means to a predetermined interval of time, which interval of time is less than the time required for the lateral driving means to effect relative movement sufficient to remove an expected difference between the lateral position of a lateral register means and the predetermined position corresponding to registry in a lateral direction between the operating means and a section of the material.

11. Control means as claimed in claim 8 comprising second lateral timer means adapted, after the application of a first lateral control signal to the lateral driving means, to prevent application of a further of the first lateral control signals to the lateral driving means for a predetermined time sufficient to prevent hunting.

12. Control means as claimed in claim 8 wherein the first lateral detecting means are mounted at a location in the path of the material in advance of the operating means, and the control means further comprise second lateral driving means for effecting relative movement laterally of the path between the first lateral detecting means and the operating means, second lateral detecting means for mounting on or near the operating means, the second lateral detecting means being adapted to detect the location in a direction laterally of the path of a lateral register means which is adjacent to the operating means relative to a predetermined position corresponding to registry in the lateral direction between the operating means and one of the said seconds of the material, means adapted to generate a second lateral control signal representative of the location of a lateral register means detected by the second lateral detecting means relative to the said predetermined position, and means for applying the second lateral control signal to the second lateral driving means, whereby relative movement is effected between the first lateral detecting means and the operating means in a sense corresponding to registry in a lateral direction between the section of the material and the operating means.

13. Control means as claimed in claim 12, comprising second lateral counter means adapted to prevent the application of a second lateral control signal to the second lateral driving means until the second lateral detecting means have, for each of a predetermined number of successive register means, detected a difference between the lateral position of the register and the predetermined position corresponding to registry in the lateral direction between a section and the operating means.

14. Control means as claimed in claim 12 comprising third lateral timer means adapted to limit the application of the second lateral control signal to the second lateral driving means to a predetermined interval of time, which interval of time is less than the time required for the second lateral driving means to effect relative movement to remove an expected difference between the lateral position of a lateral register means and the predetermined position corresponding to registry in a lateral direction between the operating means and a section of the material.

15. Control means as claimed in claim 12 comprising fourth lateral timer means adapted, after the application of a second lateral control signal to the second lateral driving means, to prevent application of a further of the second lateral control signals to the second lateral driving means for a predetermined time sufficient to prevent hunting.

16. Control means as claimed in claim 1 comprising skew detecting means adapted to detect movement of a part of the material relative to another part thereof in a direction laterally of the said path, means adapted to generate a skew control signal representative of the said movement, and means for applying the skew control signal to material driving means, whereby the drive of the material is changed in a manner which reduces the said movement.

17. Control means as claimed in claim 8 comprising skew detecting means adapted to detect movement of a part of the material relative to another part thereof in a direction laterally of the said path, means adapted to generate a skew control signal representative of the said movement, means for applying the skew control signal to the first lateral driving means, whereby the first lateral driving means operate to remove the relative movement between the said parts, and means for disconnecting the first lateral driving means from the first lateral detecting means during the application of the skew control signal thereto.

18. Control means as claimed in claim 17, comprising first skew timer means adapted to limit the application of the skew control signal to the first lateral driving means to a predetermined interval of time, which interval of time is less than the time required for the skew driving means to remove an expected relative movement between the said parts.

19. Control means as claimed in claim 17 comprising second skew timer means adapted, after the application of a skew control signal to the first lateral driving means, to prevent application of a further skew control signal or a first lateral control signal to the first lateral driving means for a predetermined time sufficient to prevent hunting.

20. Control means as claimed in claim 1 wherein the lengthwise detecting means are optical detecting means comprising a source of electromagnetic radiation, optical projection means and a photoelectric detector.

References Cited

UNITED STATES PATENTS

| 2,566,399 | 9/1951 | Bishop | 101—248 |
| 2,928,953 | 3/1960 | Bassler | 250—219 |
| 3,027,462 | 3/1962 | Helmes | 250—219 |
| 3,262,349 | 7/1966 | Hollenton et al. | 250—219 X |

FOREIGN PATENTS 641,830    8/1950    Great Britain.

WALTER STOLWEIN, Primary Examiner

U.S. Cl. X.R.

101—196; 250—223, 234

UNITED STATES PATENT OFFICE
CERTIFICATE OF CORRECTION

Patent No. 3,525,872    Dated August 25, 1970

Inventor(s) Jack M. Schneider

It is certified that error appears in the above-identified patent and that said Letters Patent are hereby corrected as shown below:

Column 7, line 55, "an" should read -- and --. Column 9, line 26, after "relay" insert -- coils --. Column 11, line 9, "and" should read -- or --. Column 13, line 17, "comprise" should read -- comprises --.

Signed and sealed this 27th day of June 1972.

(SEAL)
Attest:

EDWARD M. FLETCHER, JR.
Attesting Officer

ROBERT GOTTSCHALK
Commissioner of Patents